US007308253B2

(12) United States Patent
Moody et al.

(10) Patent No.: US 7,308,253 B2
(45) Date of Patent: Dec. 11, 2007

(54) LOG-BASED RINGTONE SERVICE

(75) Inventors: Taryn Moody, Atlantic Highlands, NJ (US); Doree Duncan Seligmann, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 92 days.

(21) Appl. No.: 10/899,662

(22) Filed: Jul. 27, 2004

(65) Prior Publication Data

US 2006/0003743 A1 Jan. 5, 2006

Related U.S. Application Data

(63) Continuation-in-part of application No. 10/881,908, filed on Jun. 30, 2004.

(51) Int. Cl.
*H04M 1/663* (2006.01)
(52) U.S. Cl. ............... 455/412.2; 455/412.1; 455/415; 455/418; 455/414.1; 455/432.2
(58) Field of Classification Search ........... 455/567, 455/550.1, 466, 432.3, 412.1, 412.2, 3.06, 455/401, 415, 418, 419
See application file for complete search history.

(56) References Cited

U.S. PATENT DOCUMENTS

| 5,001,709 | A | 3/1991 | Satoh |
| 5,241,586 | A | 8/1993 | Wilson et al. |
| 5,661,788 | A | 8/1997 | Chin |
| 5,870,684 | A * | 2/1999 | Hoashi et al. ............... 455/567 |
| 6,363,258 | B1 | 3/2002 | Schmidt et al. |
| 6,381,322 | B1 | 4/2002 | Spencer |
| 6,532,477 | B1 | 3/2003 | Tang et al. |
| 6,675,026 | B2 | 1/2004 | Yoon |
| 6,944,284 | B2 | 9/2005 | Goodings |
| 6,950,648 | B2 | 9/2005 | Pappalardo et al. |
| 2002/0039914 | A1 | 4/2002 | Hama et al. |
| 2002/0098875 | A1 | 7/2002 | Takenaka |
| 2003/0008687 | A1 | 1/2003 | Nishimura |
| 2003/0012361 | A1 | 1/2003 | Yoshimura |
| 2003/0026413 | A1 | 2/2003 | Brandt et al. |
| 2003/0027605 | A1 * | 2/2003 | Hijii ........................... 455/567 |

(Continued)

FOREIGN PATENT DOCUMENTS

EP 1330124 A2 7/2003

(Continued)

*Primary Examiner*—Rafael Perez-Gutierrez
*Assistant Examiner*—Khai Nguyen
(74) *Attorney, Agent, or Firm*—DeMont & Breyer LLC

(57) ABSTRACT

An apparatus and methods are disclosed for enabling a telecommunications terminal to notify its user of the arrival of a message via a ringtone whose properties are based on information from one or more call logs. A network infrastructure element (e.g., a switch, a server, etc.) receives a message directed to a terminal and establishes property values for a ringtone (e.g., tempo, volume, pitch, rhythm, etc.) based on information from a call log (e.g., how many times the caller has called today, whether an earlier call from this caller was returned, etc.). In a first illustrative embodiment the network infrastructure element sends the message and the instantiated ringtone to the terminal, while in a second illustrative embodiment the network infrastructure element sends the message and the property values to the terminal, and the terminal plays a locally-stored ringtone in accordance with the property values.

13 Claims, 17 Drawing Sheets

U.S. PATENT DOCUMENTS

| | | |
|---|---|---|
| 2003/0039339 A1 | 2/2003 | Luehrig et al. |
| 2003/0146921 A1 | 8/2003 | Taniguchi et al. |
| 2003/0152205 A1 | 8/2003 | Winkler |
| 2003/0198322 A1 | 10/2003 | White, Jr. |
| 2004/0032946 A1 | 2/2004 | Koser et al. |
| 2004/0066932 A1 | 4/2004 | Seligmann |
| 2004/0213401 A1 | 10/2004 | Aupperle et al. |
| 2004/0253993 A1* | 12/2004 | Nakamura ............... 455/567 |
| 2005/0107128 A1* | 5/2005 | Deeds ..................... 455/567 |
| 2005/0181838 A1* | 8/2005 | Matsuda et al. ......... 455/567 |
| 2007/0129078 A1* | 6/2007 | De Beer ................... 455/445 |

FOREIGN PATENT DOCUMENTS

| | | |
|---|---|---|
| EP | 1501072 A1 | 1/2005 |
| JP | 11275209 | 10/1999 |
| JP | 2000-253111 A | 9/2000 |
| JP | 2000244633 | 9/2000 |
| JP | 2001-007902 A | 1/2001 |
| JP | 2001-094637 A | 4/2001 |
| JP | 2001-168952 A | 6/2001 |
| JP | 2001168952 | 6/2001 |
| JP | 2001-274867 A | 10/2001 |
| JP | 2001-320471 A | 11/2001 |
| JP | 2001358834 | 12/2001 |
| JP | 2002-14200 A | 5/2002 |
| JP | 2003-47043 A | 2/2003 |
| JP | 2003-69662 A | 3/2003 |
| JP | 2003-218999 A | 7/2003 |
| JP | 2003-244280 A | 8/2003 |
| WO | 02/087209 A2 | 10/2002 |

* cited by examiner

Figure 7

Call Logs 700

(a) 401

| Calling Party | Number | Time/Date | Duration |
|---|---|---|---|
| Barb Smith | 732-555-9872 | 01:15pm; 04/22/04 | 01:03:04 |
| Sam Perez | 609-555-0923 | 12:44pm; 04/22/04 | 00:00:12 |
| ... | ... | ... | ... |
| John Doe | 212-555-0964 | 07:32am; 10/23/03 | 00:38:52 |

(b) 402

| Called Party | Number | Time/Date | Duration |
|---|---|---|---|
| John Doe | 212-555-0964 | 01:07pm; 04/22/04 | 00:03:04 |
| Susan Jones | 603-555-1123 | 08:49am; 04/22/04 | 00:59:12 |
| ... | ... | ... | ... |
| Linda Giordano | 415-555-9378 | 09:23am; 10/23/03 | 01:31:32 |

(c) 403

| Calling Party | Number | Time/Date | Call Treatment |
|---|---|---|---|
| Liz Brown | 732-555-6544 | 01:16pm; 04/22/04 | Voice Mail |
| Liz Brown | 732-555-6544 | 11:54am; 04/22/04 | Cell Phone |
| ... | ... | ... | ... |
| Susan Jones | 603-555-1123 | 10:17am; 10/23/03 | Voice Mail |

LOG-BASED RINGTONE SERVICE

CROSS-REFERENCE TO RELATED APPLICATIONS

This application is a continuation-in-part of U.S. patent application Ser. No. 10/881,908, filed 30 Jun. 2004 (now pending), entitled "Log-Based Ringtones", which is incorporated by reference.

FIELD OF THE INVENTION

The present invention relates to telecommunications equipment in general, and, in particular, to techniques for intelligently notifying the user of a telecommunications terminal of the arrival of a message.

BACKGROUND OF THE INVENTION

FIG. 1 depicts telecommunications system 100 comprising telecommunications terminal 105 (e.g., a wireless telephone, a wireline telephone, a personal digital assistant [PDA], etc.) and network 120 (e.g., the Public Switched Telephone Network [PSTN], a cellular wireless network, a wireless local-area network, etc.) in accordance with the prior art. Telecommunications terminal 105 is capable of receiving messages (e.g., voice telephone calls, email messages, Short Message Service [SMS] messages, etc.) from other telecommunications terminals via network 120. When telecommunications terminal 105 receives a message, it notifies the user of the terminal of the arrival of the message by playing a "ringtone" (e.g., a tune, a series of beeps, etc.) via speaker 110 and by displaying visual information (e.g., text, an image, etc.) via display 111. Telecommunications terminal 105 might play a particular ringtone for all incoming messages, or a ringtone that is associated with a category of callers (e.g., a ringtone for business contacts, a ringtone for friends, a ringtone for family members, etc.), or a ringtone that is associated with an individual caller, etc. Similarly, telecommunications terminal 105 might display a text message (e.g., "Incoming Call", "Incoming Call: Mom", "Incoming Call: 555-555-5555", etc.) or an image (e.g., an animated icon of a ringing telephone, a photo of the caller, etc.), or both, to indicate that there is an incoming message.

When telecommunications terminal 105 receives a call, a record of the call is typically stored in a call log that specifies information about the call such as the identity of the caller, what time the call was received, whether the call was answered or missed, the duration of the call, etc. A call log can similarly maintain a record of outgoing calls that are placed by the user of telecommunications terminal 105.

FIG. 2 depicts an illustrative block diagram of the salient components of network 120 in the prior art. As shown in FIG. 2, network 120 comprises a plurality of network infrastructure elements 201-*i* for i=1 to 4, interconnected as shown. Each network infrastructure element 201-*i* might be a switch, a private branch exchange (PBX), a wireless base station, a wireless switching center, a server, etc., depending on the type and topology of network 120. As will be understood by those skilled in the art, although all network infrastructure elements are denoted by the same prefix 201, element 201-1 might be a switch, while element 201-2 might be a private branch exchange, etc. Similarly, the fact that network 120 has four elements 201 in FIG. 2 is merely illustrative; network 120 might have fewer elements or a greater number of elements than that depicted.

SUMMARY OF THE INVENTION

The present invention enables a telecommunications terminal to notify its user of the arrival of a message via a ringtone whose properties are based on information from one or more call logs. In particular, in the illustrative embodiments a network infrastructure element (e.g., a switch, a wireless base station, a server, etc.) that receives a message directed to a telecommunications terminal sets the values of one or more properties of a ringtone (e.g., tempo, volume, pitch, rhythm, etc.) based on information from one or more call logs. Pertinent call logs might include call logs associated with the telecommunications terminal that receives the call, call logs associated with other telecommunications terminals used by the user, call logs associated with a particular private branch exchange (PBX), etc. Examples of such call log information include: (i) the time of the most recent prior message from the caller; (ii) the number of times that the caller has attempted to contact the user during a particular time interval; etc.

For example, if a telecommunications terminal plays the Beatles song "Hello Goodbye" when a message arrives, the song might be played in a variety of ways, depending on attributes of the message:

at a faster tempo for each successive message sent by a given person on the same day, as a piano version for the first email of the day received from a given person, at a louder volume when a prior call from this caller was missed and has not yet been returned, with a higher pitch instead of a lower pitch when no messages have been received in the last two hours, or with a lively rhythm when receiving a call from a particular caller for the first time.

As will be appreciated by those skilled in the art, modifying the values of properties such as volume and tempo does not change the fundamental identity of the song. In other words, the melody of the song is independent of these properties and, therefore, the song remains recognizable.

In the first illustrative embodiment, when a network infrastructure element receives a message for sending to a telecommunications terminal, the element sends a signal that represents an instance of a ringtone (e.g., an audio clip, a Musical Instrument Digital Interface [MIDI] file, etc.) along with the message. The values of one or more musical properties of the ringtone instance, such as tempo, volume, pitch, rhythm, etc., are established based on information from one or more call logs.

In the second illustrative embodiment, the network infrastructure element determines property values for music (e.g., key signature equals C major, metronome marking equals 140 beats per minute, etc.) based on one or more attributes of the message, and sends the property values, but not an instance of a ringtone, to the telecommunications terminal along with the message. The telecommunications terminal then plays a ringtone that is stored at the terminal in accordance with the received property values.

The illustrative embodiments of the present invention similarly establish values of properties of images and text that are displayed to notify the user of an incoming message. Values of properties such as brightness, size, contrast, resolution, etc. can be changed without interfering with the user's ability to recognize an image. For example, when an incoming message is determined to be important based on a call log (e.g., the first ten messages from a new client, etc.), an image might be displayed at a higher brightness, or an animated image might move at a faster speed.

As in the case of ringtones, in the first illustrative embodiment the network infrastructure element sends a signal that represents an instance of an image (e.g., a Joint Photographic Experts Group [JPEG] file, a Graphics Interchange Format [GIF] file, etc.) to the telecommunications terminal along with the message, where the values of one or more properties of the image instance are established based on information from one or more call logs.

In the second illustrative embodiment, the network infrastructure element determines property values for images (e.g., resolution equals 100 by 120 pixels, saturation equals 90%, etc.) based on one or more call logs, and sends the property values, but not an instance of an image, to the telecommunications terminal along with the message. The telecommunications terminal then displays an image that is stored at the terminal in accordance with the received property values.

The illustrative embodiments of the present invention similarly establish property values for text (e.g., font size, font style, color, dynamic behavior such as flashing, etc.) that is displayed to notify the user of an incoming message. For example, when an incoming message is determined to be important based on information from a call log, a text notification might flash or might be rendered in a bold font to indicate the importance of the message. For text notifications, both the first and second illustrative embodiments send one or more property values of text with the message (i.e., no text is sent), and the telecommunications terminal displays an appropriate text string in accordance with the received property values.

In some embodiments of the present invention, one or more property values of the output signal (i.e., ringtone, image, or text) might also be based on one or more attributes of the incoming message (e.g., the identity of the sender of the message, a priority level embedded in the message, a subject associated with the message, the semantic content of the message, the location from which the message was sent, etc.).

The illustrative embodiment comprises: (a) receiving at a telecommunications terminal (i) a message, and (ii) a first signal representing an instance of a musical composition; and (b) outputting an acoustic second signal based on the first signal to notify the user of the telecommunications terminal of the arrival of the message; wherein the value of a property of the instance is based on information from one or more call logs; and wherein the property is a property of music that is independent of melody.

BRIEF DESCRIPTION OF THE DRAWINGS

FIG. 7 depicts an illustrative organization of information in call log 700, in accordance with the illustrative embodiment of the present invention.

DETAILED DESCRIPTION

The terms appearing below is given the following definition for use in this Description and the appended Claims.

For the purposes of the specification and claims, the term "message" is defined as a signal sent from a first telecommunications terminal to a second telecommunications terminal that does one or both of the following: (i) transmits information, or (ii) attempts to establish a dialogue between the terminals. Examples of messages include a telephone call setup signal, an email, an instant message [IM], etc.

For the purposes of the specification and claims, the term "call" is defined similarly to "message": a signal sent from a first telecommunications terminal to a second telecommunications terminal that does one or both of the following: (i) transmits information, or (ii) attempts to establish a dialogue between the terminals. Examples of calls include a telephone call setup signal, an email, an instant message [IM], etc.

For the purposes of the specification and claims, a person that initiates a signal that is sent from a first telecommunications terminal to a second telecommunications terminal is referred to as the "caller" when the signal is referred to as a "call," and is referred to as "the sender" when the signal is referred to as a "message."

For the purposes of the specification and claims, the term "musical composition" is defined as either a piece of music or a sound effect (e.g., one or more beeps, etc.).

For the purposes of the specification and claims, the term "call log" is defined as a data structure that stores information about calls and/or messages.

Figure 3:
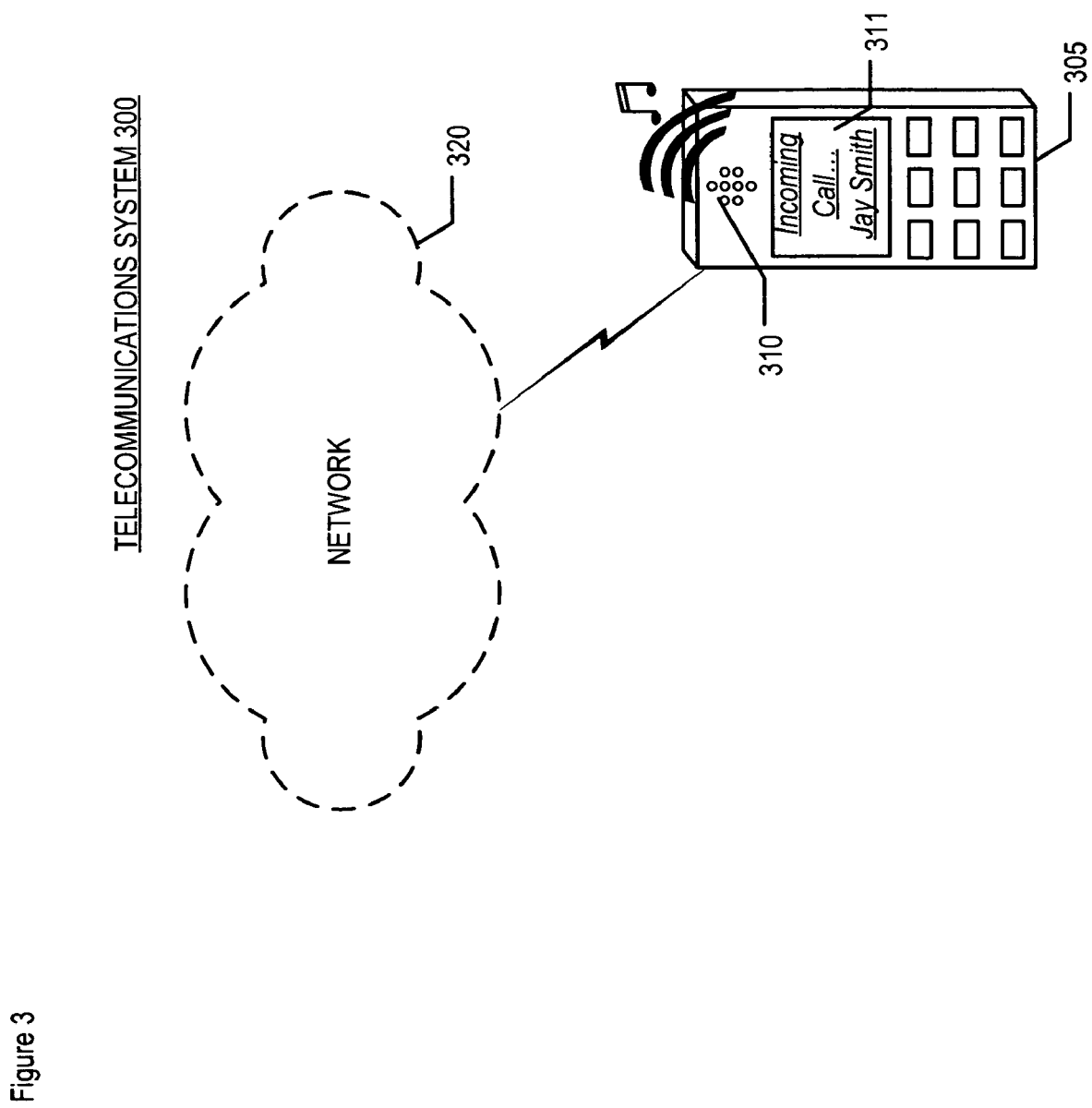
FIG. 3 depicts a telecommunications system in accordance with the illustrative embodiments of the present invention.

FIG. 3 depicts a telecommunications system 300 in accordance with the illustrative embodiments of the present invention. As shown in FIG. 3, telecommunications system 300 comprises telecommunications terminal 305 and network 320.

Telecommunications terminal 305 is a wireless telephone, a wireline telephone, a personal digital assistant (PDA), etc. that is capable of receiving messages (e.g., voice telephone calls, email messages, Short Message Service [SMS] messages, etc.) from other telecommunications terminals via network 320, and of notifying its user of the arrival of a message as described below and with respect to FIGS. 12 and 17. As shown in FIG. 3, telecommunications terminal 305 comprises speaker 310 and display 311. Speaker 310, like speaker 110 of telecommunications terminal 105, is capable of generating acoustic signals (e.g., ringtones, etc.) in well-known fashion, and display 311, like display 111 of telecommunications terminal 105, is capable of displaying visual signals (e.g., text, images, etc.) in well-known fashion.

Network 320 is a communications network (e.g., the Public Switched Telephone Network [PSTN], a cellular wireless network, a wireless local-area network, etc.) that sends messages to telecommunications terminal 305 as described below and with respect to FIGS. 8 through 11 and FIGS. 13 through 16.

Figure 1:
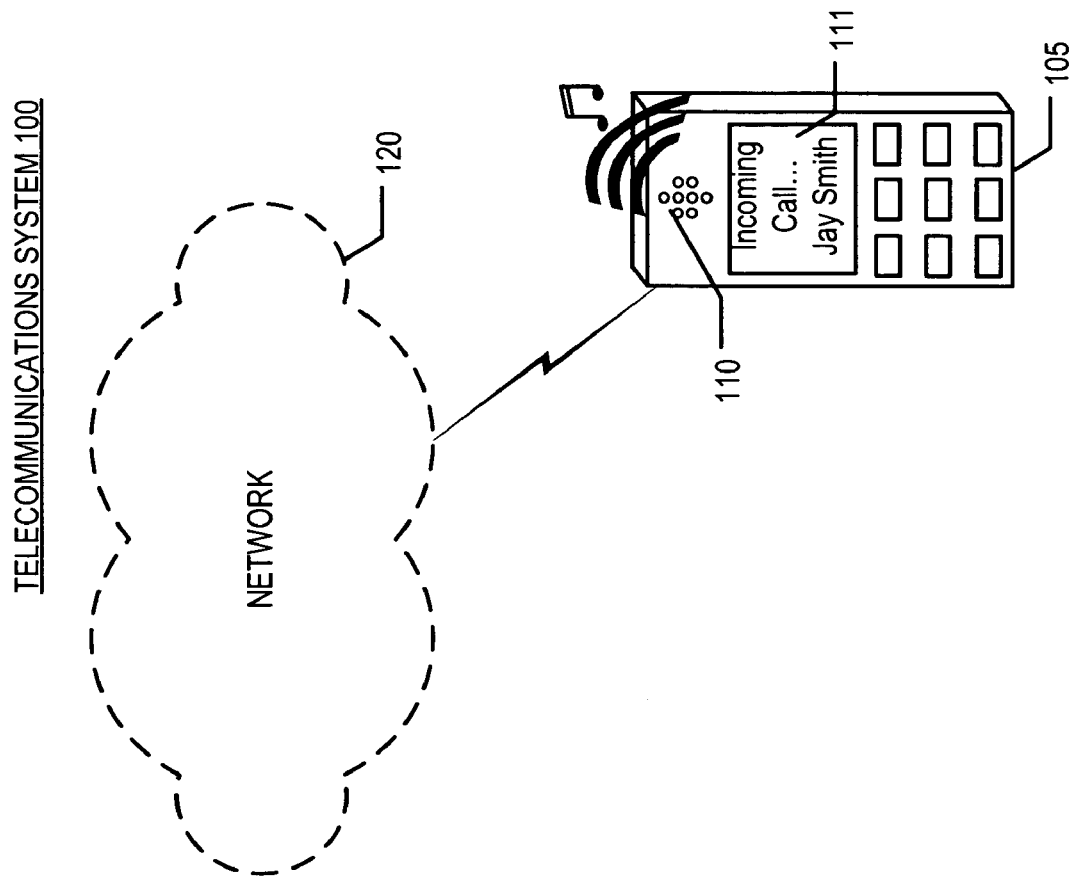
FIG. 1 depicts a telecommunications system in the prior art.
Figure 2:
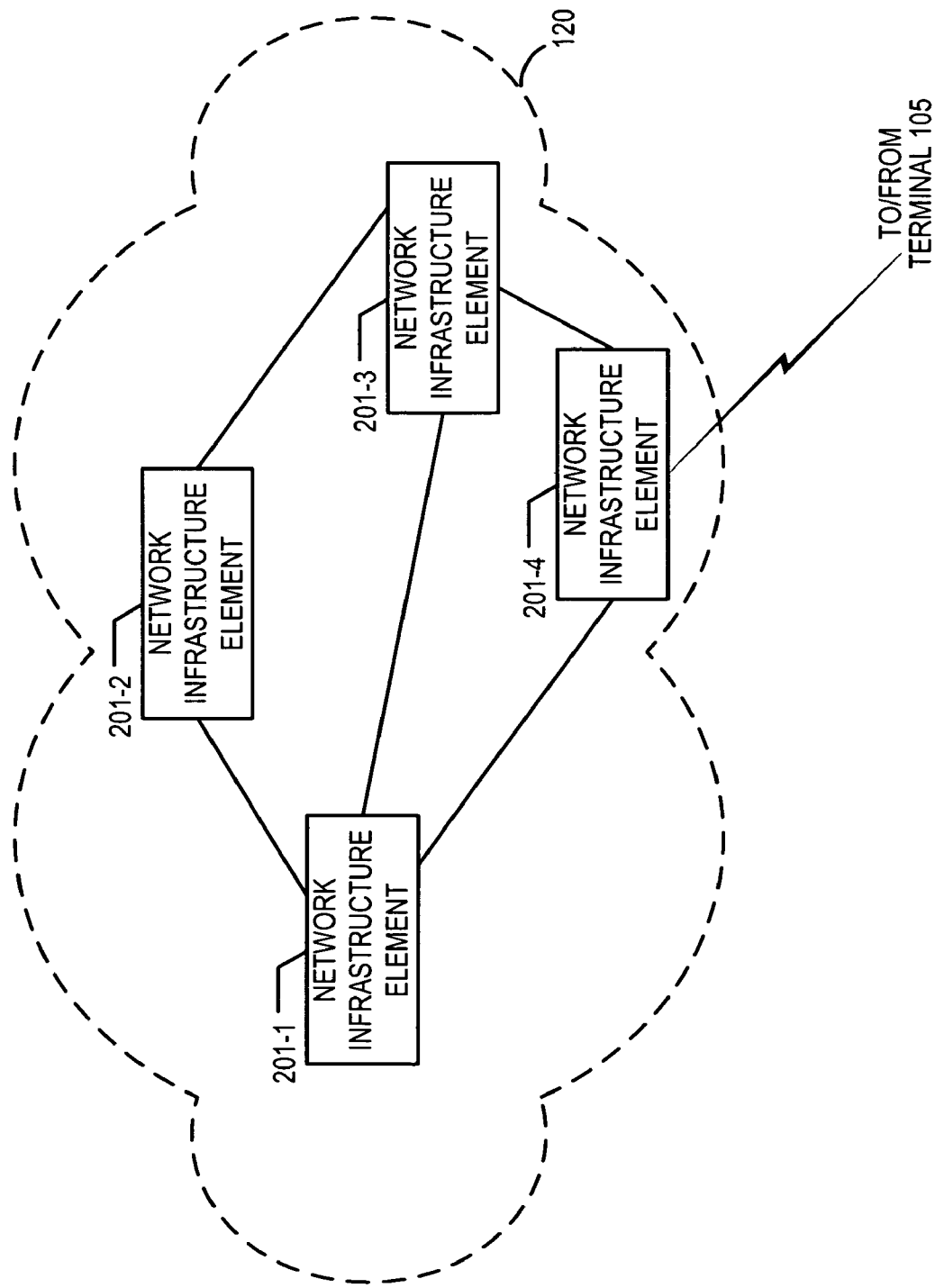
FIG. 2 depicts an illustrative block diagram of the salient components of network 120, as shown in FIG. 1, in the prior art.
Figure 4:
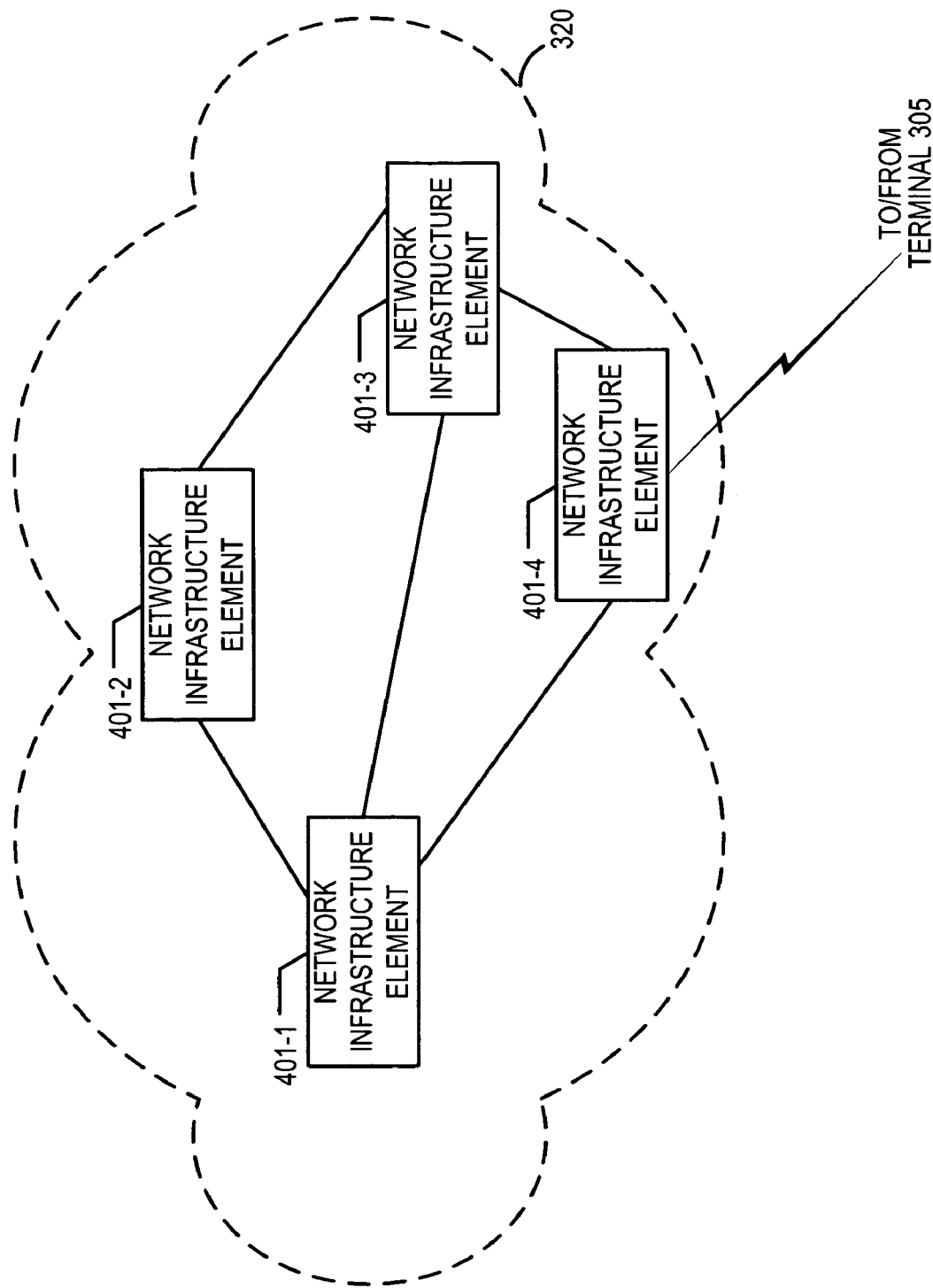
FIG. 4 depicts an illustrative block diagram of the salient components of network 320, as shown in FIG. 3, in accordance with the illustrative embodiments of the present invention.

FIG. 4 depicts an illustrative block diagram of the salient components of network 320 in accordance with the illustrative embodiments of the present invention. As shown in FIG. 4, network 320 comprises a plurality of network infrastructure elements 401-$i$ for i=1 to 4, interconnected as shown. Each network infrastructure element 401-$i$ (e.g., a switch, a private branch exchange (PBX), a wireless base station, a wireless switching center, a server, etc.) is capable of sending messages to telecommunications terminal 305 (either directly or via one or more other network infrastructure elements 401, depending on what kind of element it is) as described below and with respect to FIGS. 8 through 11 and FIGS. 13 through 16. As in the case of FIG. 2, the fact that FIG. 4 depicts network 320 with four elements 401 is merely illustrative.

Figure 5:
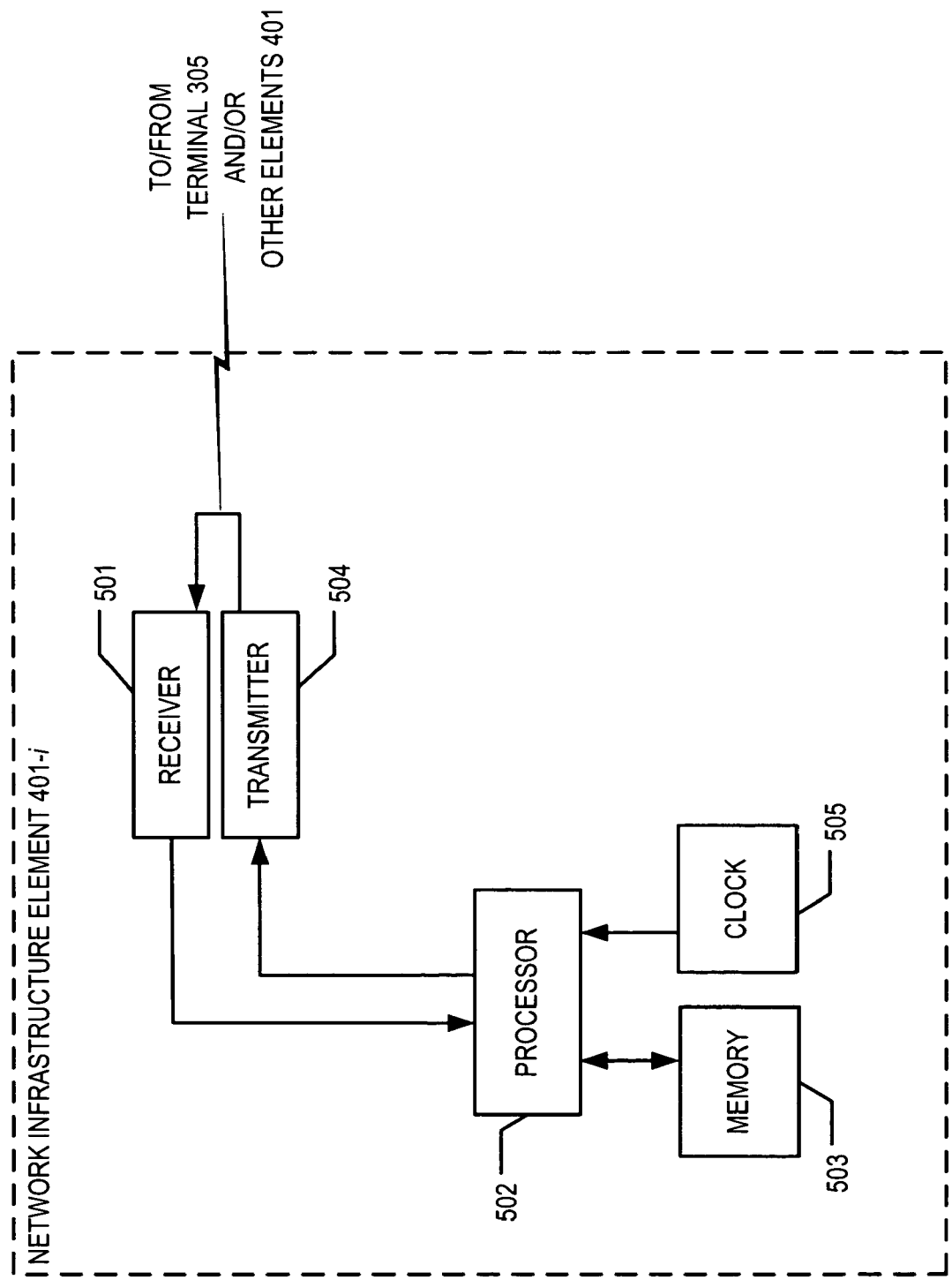
FIG. 5 depicts a block diagram of the salient components of network infrastructure element 401-i, as shown in FIG. 4, in accordance with the illustrative embodiments of the present invention.

FIG. 5 depicts a block diagram of the salient components of network infrastructure element 401-$i$ in accordance with the illustrative embodiments of the present invention. As shown in FIG. 5, network infrastructure element 401-$i$ comprises receiver 501, processor 502, memory 503, and transmitter 504, interconnected as shown.

Receiver 501 receives signals from one or both of telecommunications terminal 305 and other elements 401, depending on the type of element 401-$i$ is, and forwards the information encoded in these signals to processor 502 in well-known fashion. It will be clear to those skilled in the art, after reading this disclosure, how to make and use receiver 501.

Processor 502 is a general-purpose processor that is capable of reading data from and writing data into memory 503 and of executing the tasks described below and with respect to FIGS. 8 through 11 and FIGS. 13 through 16. In some alternative embodiments of the present invention, processor 502 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. It will be clear to those skilled in the art, after reading this disclosure, how to make and use memory 503.

Transmitter 504 receives information from processor 502 and transmits signals that encode this information to one or both of telecommunications terminal 305 and other elements 401, depending on the type of element 401-$i$ is, in well-known fashion. It will be clear to those skilled in the art, after reading this disclosure, how to make and use transmitter 504.

Figure 6:
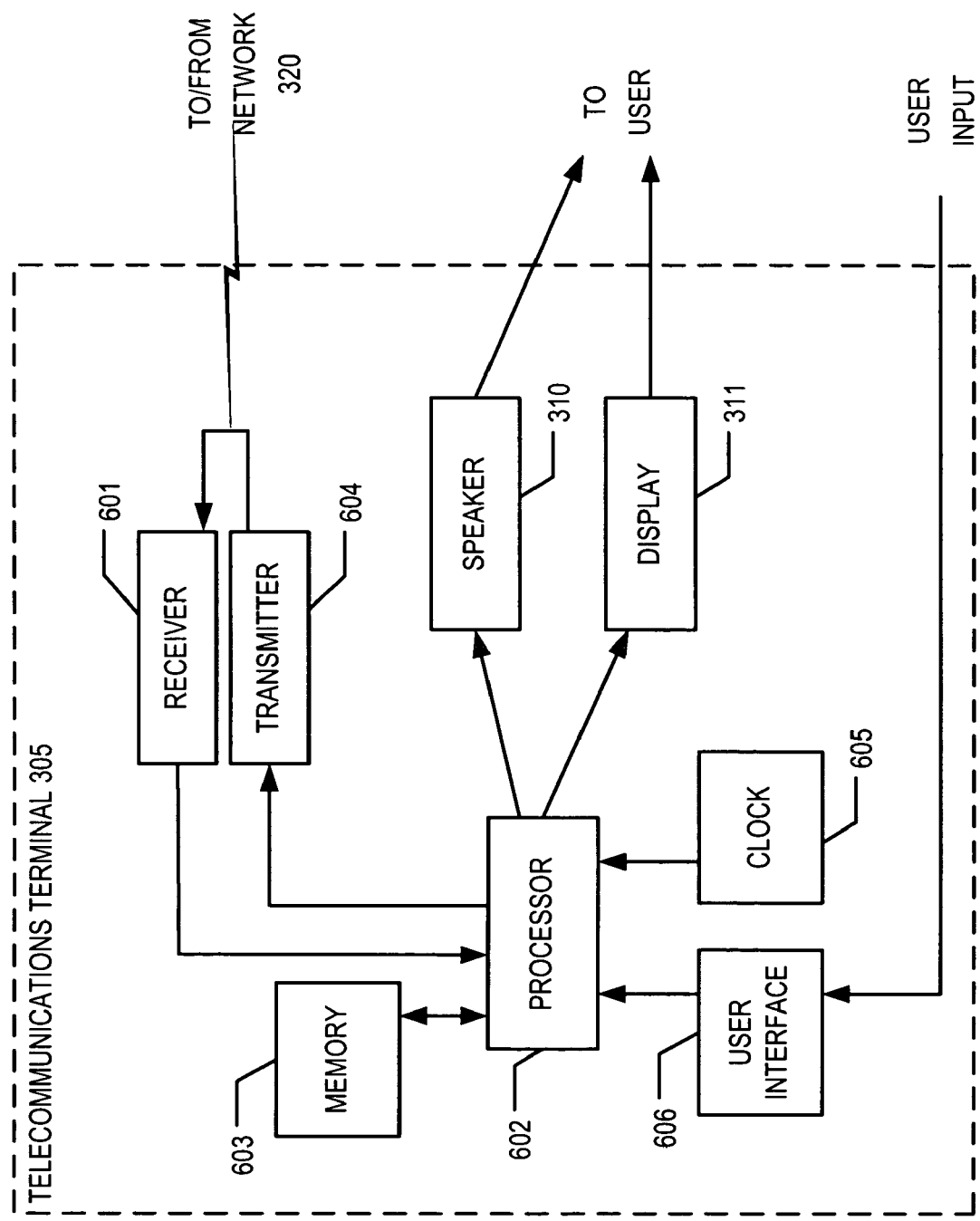
FIG. 6 depicts a block diagram of the salient components of telecommunications terminal 305, as shown in FIG. 3, in accordance with the illustrative embodiments of the present invention.

FIG. 6 depicts a block diagram of the salient components of telecommunications terminal 305, in accordance with the illustrative embodiments of the present invention. As shown in FIG. 6, telecommunications terminal 305 comprises receiver 601, processor 602, memory 603, transmitter 604, speaker 310, and display 311, interconnected as shown.

Receiver 601 is capable of receiving signals sent from network 320 and of forwarding the information encoded in these signals to processor 602, in well-known fashion. It will be clear to those skilled in the art, after reading this disclosure, how to make and use receiver 601.

Processor 602 is a general-purpose processor that is capable of reading data from and writing data into memory 603, of sending signals to speaker 310 and display 311 in well-known fashion, and of executing the tasks described below and with respect to FIGS. 12 and 17. In some alternative embodiments of the present invention, processor 602 might be a special-purpose processor. In either case, it will be clear to those skilled in the art, after reading this disclosure, how to make and use processor 602.

Memory 603 stores data and executable instructions, as is well-known in the art, and might be any combination of random-access memory (RAM), flash memory, disk drive, etc. It will be clear to those skilled in the art, after reading this disclosure, how to make and use memory 603.

Transmitter 604 is capable of receiving information from processor 602 and of transmitting signals that encode this information to network 320 in well-known fashion. It will be clear to those skilled in the art, after reading this disclosure, how to make and use transmitter 604.

FIG. 7 depicts three tables for an illustrative organization of information in call log 700, in accordance with the illustrative embodiment of the present invention. Call log 700 is a record of call activity that comprises at least a subset of:

i. All of the calls made and completed to terminal 305 (i.e., "incoming calls");

ii. All of the calls originating from terminal 305 (i.e., "outgoing calls"); and iii. All of the calls made, but not completed, to terminal 305 (i.e., "missed calls").

Incoming log 701 comprises the status of incoming calls. For each incoming call, incoming log 701 comprises: the identity (if known) of the caller; the telephone number of the caller; the time and date of the call; and the duration of the call.

Outgoing log 702 comprises the status of outgoing calls. For each outgoing call, outgoing log 702 comprises: the identity of the called party; the telephone number of the called party; the time and date of the call; and the duration of the call.

Missed log 703 comprises the status of missed calls. For each missed call, missed log 703 comprises: the identity (if known) of the caller; the contact identifier (e.g., telephone number, email address, etc.) of the caller; the time and date of the call; and the treatment of the call (if known). The call treatment information, if known, indicates if the call was directed to voicemail, directed to another terminal, or handled in another way.

Although call log 700 as depicted in FIG. 4 provides a record of telephone calls only, it will be clear to those skilled in the art, after reading this specification, how to use call logs that provide a record of other kinds of messages (e.g., emails, instant messages, etc.) As will be appreciated by those skilled in the art, in some embodiments a call log might record information for different kinds of calls and messages, while in some other embodiments there might be a call log for each kind of message.

As will be appreciated by those skilled in the art, although in the illustrative embodiment call log 700 maintains a record of calls associated with terminal 305 (i.e., calls received at terminal 305, calls placed from terminal 305, and calls received at terminal 305 that were missed), in some alternative embodiments call log 700 might maintain a record of calls for a plurality of terminals associated with a user (for example, a user's wireless phone, wireline phone, and PDA). It will be clear to those skilled in the art, after reading this specification, how to aggregate individual call logs from multiple terminals for the purpose of retrieving information from an aggregated call log.

As will also be appreciated by those skilled in the art, in some embodiments call log 700 might be stored in memory 603 of terminal 305, while in some other embodiments a plurality of call logs 700 corresponding to a plurality of telecommunications terminals might instead be stored at one or more of network infrastructure elements 401 or at a remote server. As will be further appreciated by those skilled in the art, in the latter case the plurality of call logs could be stored in a variety of different organization schemes: one call log for each user (i.e., all terminals associated with a given user combined into a single call log); each call log stored separately; call logs for all users aggregated into a single call log; etc.

Terminal 305 uses information in call log 700 to determine the values of one or more properties of an output signal (e.g., a ringtone, an image, etc.) for notifying the user of an incoming call. For example, if Sam Perez were to call at 2:00 pm on Apr. 22, 2004, then it could be readily determined that it has been one hour, sixteen minutes since Sam's most recent prior communication (at 12:44 pm on the same day). As another example, if Liz Brown were to call at 1:30 pm on Apr. 22, 2004, then it could be readily determined that her latest call is her second attempt since 1:00 pm to reach the user of terminal 305. As will be appreciated by those skilled in the art, other facts can be established from the information in call log 700 in a similar fashion.

Figure 8:
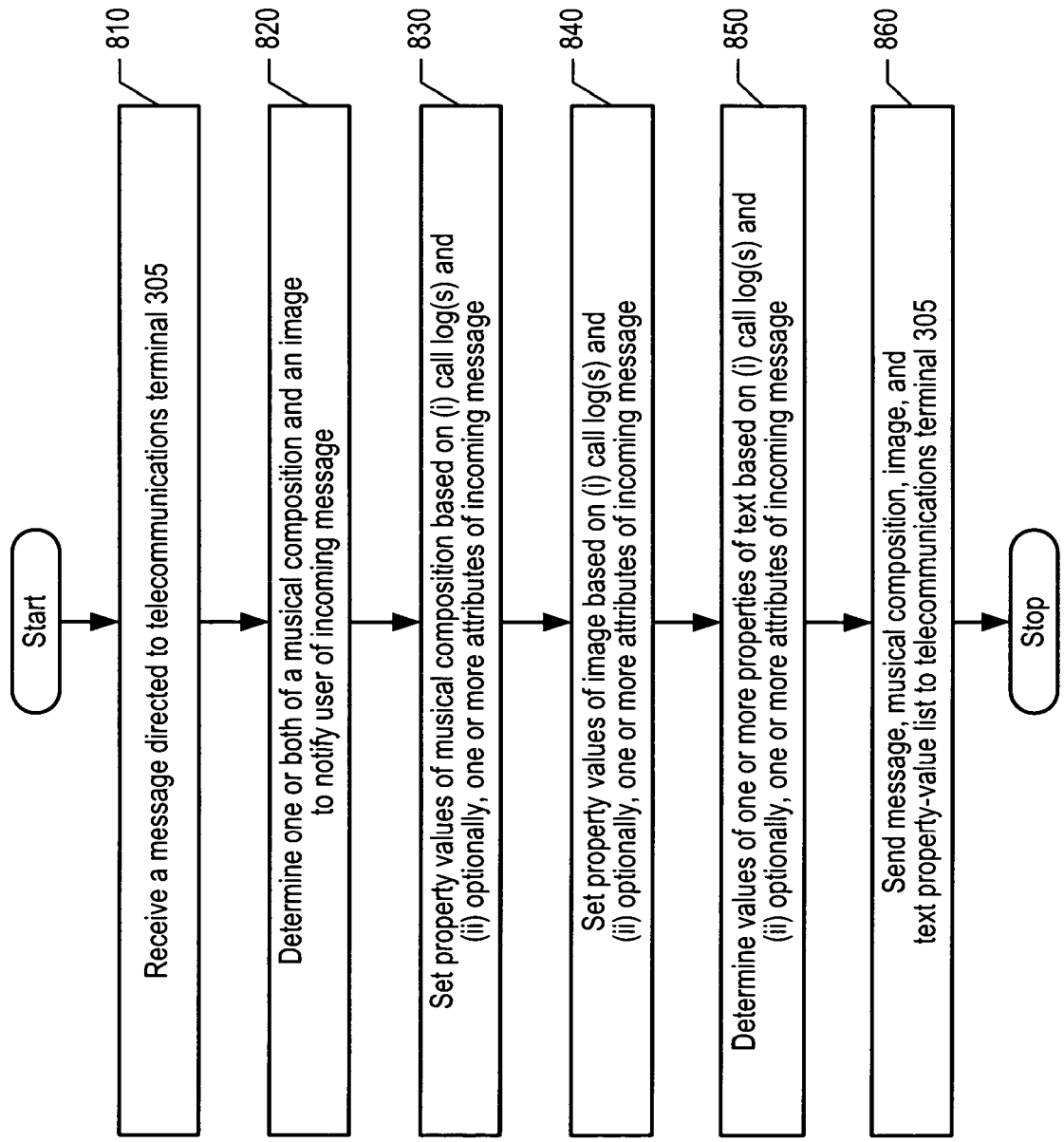
FIG. 8 depicts a flowchart of the salient tasks of network infrastructure element 401-i, as shown in FIG. 4, in accordance with the first illustrative embodiment of the present invention.

FIG. 8 depicts a flowchart of the salient tasks of network infrastructure element 401-*i* in accordance with the first illustrative embodiment of the present invention. For any given message sent to telecommunications terminal 305, the method of FIG. 8 need only be performed by one of the network infrastructure elements 401-*i* in the (potentially multi-hop) path from the message sender to telecommunications terminal 305. (For example, the method might be performed only by edge switches, or only by wireless base stations, etc.) It will be clear to those skilled in the art which tasks depicted in FIG. 8 can be performed simultaneously or in a different order than that depicted.

At task 810, receiver 501 of network infrastructure element 401-*i* receives a message directed to telecommunications terminal 305 and forwards the message to processor 502, in well-known fashion.

At task 820, processor 502 determines what musical composition (i.e., ringtone) and/or what image will be used to notify the user of telecommunications terminal 305 of the arrival of the message. In some embodiments the user of telecommunications terminal 305 might be notified via the same musical composition and image for all incoming messages, while in some other embodiments musical compositions and images might be associated with categories of callers, while in still some other embodiments each individual caller might have an associated musical composition and image, etc. As will be appreciated by those skilled in the art, in some embodiments these ringtone and image "rules" might be specified by the user of telecommunications terminal 305 and uploaded to memory 503 of network infrastructure element 401-*i*, while in some other embodiments the calling terminal might automatically piggyback a ringtone and/or image on outgoing messages, etc.

At task 830, processor 502 sets the values of one or more properties of the musical composition that was determined at task 820 based on
  (i) information from one or more call logs, and optionally:
  (ii) one or more attributes of the incoming message, as described in detail below and with respect to FIG. 9.

At task 840, processor 502 sets the values of one or more properties of the image that was determined at task 820 based on
  (i) information from one or more call logs, and optionally:
  (ii) one or more attributes of the incoming message, as described in detail below and with respect to FIG. 10.

At task 850, processor 502 determines the values of one or more properties of text based on
  (i) information from one or more call logs, and optionally:
  (ii) one or more attributes of the incoming message, as described in detail below and with respect to FIG. 11.

At task 860, processor 502 forwards the message, a file comprising the musical composition as "instantiated" at task 830 (e.g., an audio clip, a Musical Instrument Digital Interface [MIDI] file, etc.), the image as instantiated at task 840, and the text property values determined at task 850 to transmitter 504 for sending to telecommunications terminal 305, in well-known fashion. After task 860, the method of FIG. 8 terminates.

Figure 9:
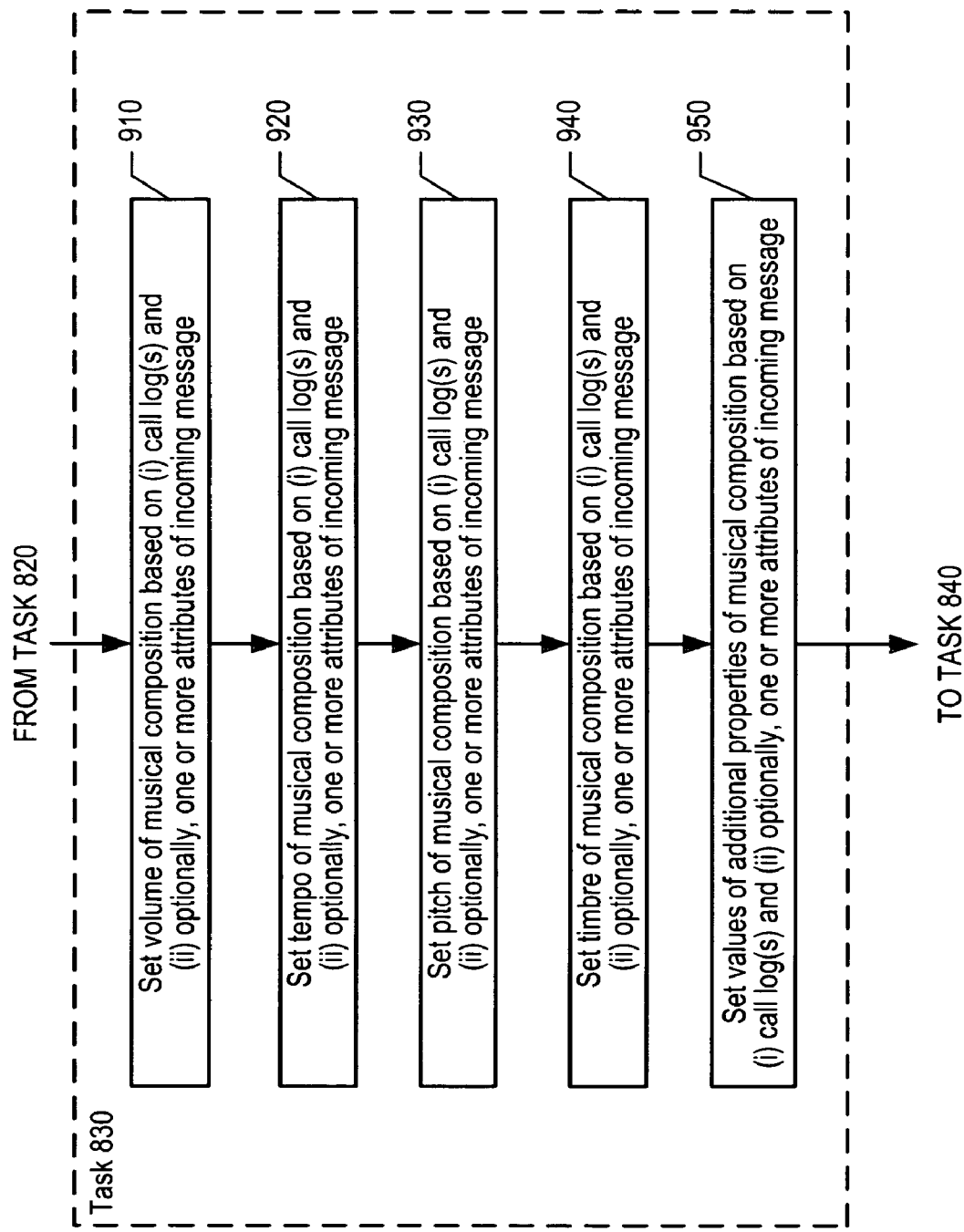
FIG. 9 depicts a detailed flowchart of task 830, as shown in FIG. 8, in accordance with the first illustrative embodiment of the present invention.

FIG. 9 depicts a detailed flowchart of task 830 in accordance with the first illustrative embodiment of the present invention. It will be clear to those skilled in the art which tasks depicted in FIG. 9 can be performed simultaneously or in a different order than that depicted.

At task 910, processor 502 sets the volume of the musical composition based on pertinent entries from one or more call logs. In some embodiments, processor 502's setting of volume might also be based on one or more attributes of the incoming message, such as: the identity of the sender of the message, a priority associated with the message, a subject associated with the message, the semantic content of the message, the location from which the message was sent (if such information is available), etc. As will be appreciated by those skilled in the art, the logic by which processor 502 sets the volume of the musical composition might be specified by a network 320 service provider, or by the user of telecommunications terminal and uploaded to network infrastructure element 401-*i*, etc.

At task 920, processor 502 sets the tempo of the musical composition based on pertinent entries from one or more call logs, and optionally, on one or more attributes of the message, as in task 910.

At task 930, processor 502 sets the pitch (i.e., key signature) of the musical composition based on pertinent entries from one or more call logs, and optionally, on one or more attributes of the message.

At task 940, processor 502 sets the timbre (e.g., the musical instrument playing the composition, etc.) of the musical composition based on pertinent entries from one or more call logs, and optionally, on one or more attributes of the message.

At task 950, processor 502 sets the values of additional properties of the musical composition (e.g., harmony, rhythm, gender for vocal music, language for vocal music, etc.) based on pertinent entries from one or more call logs, and optionally, on one or more attributes of the message. After task 950, execution continues at task 840.

Figure 10:
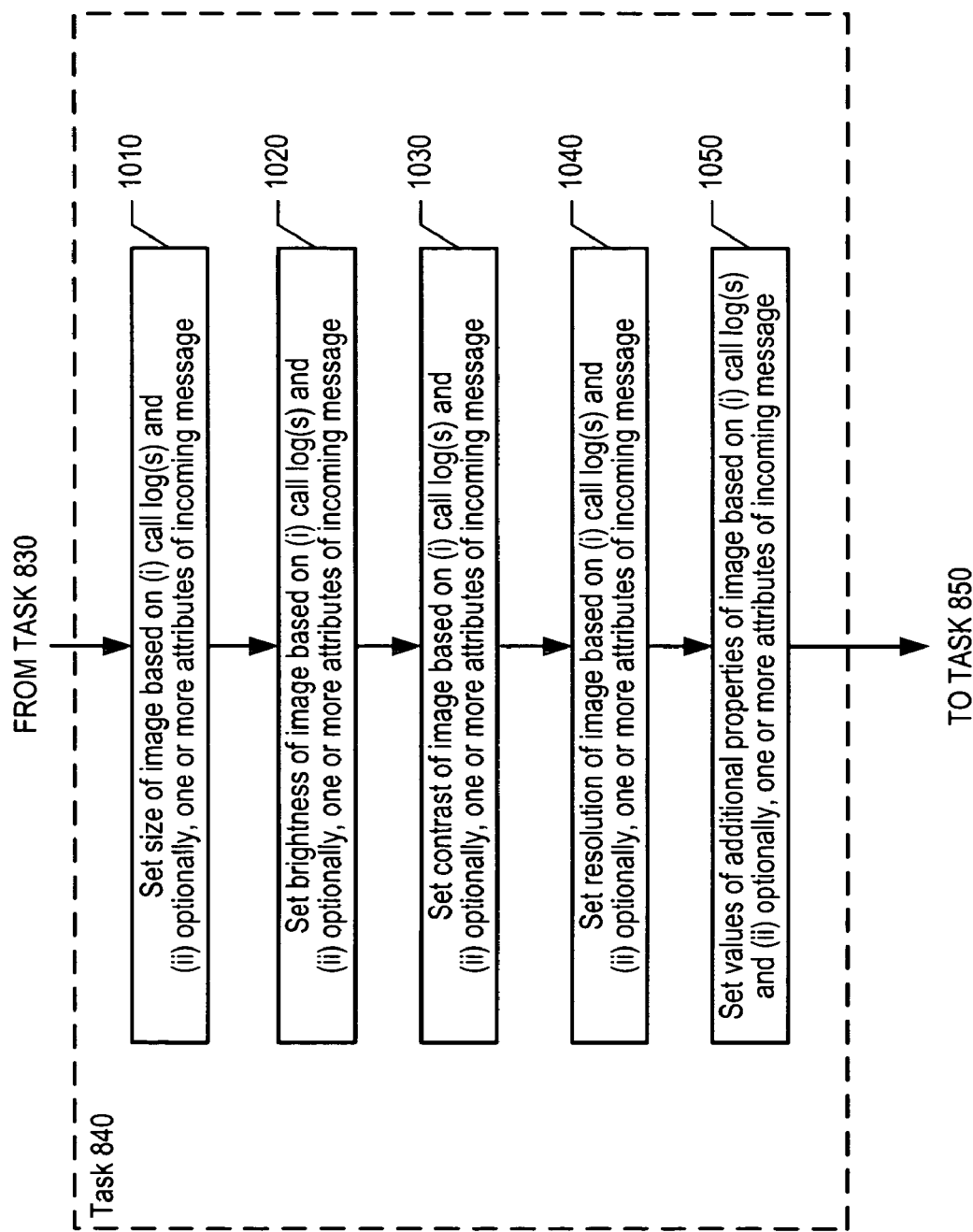
FIG. 10 depicts a detailed flowchart of task 840, as shown in FIG. 8, in accordance with the first illustrative embodiment of the present invention.

FIG. 10 depicts a detailed flowchart of task 840 in accordance with the first illustrative embodiment of the present invention. It will be clear to those skilled in the art which tasks depicted in FIG. 10 can be performed simultaneously or in a different order than that depicted.

At task 1010, processor 502 sets the size of the image based on pertinent entries from one or more call logs, and optionally, on one or more attributes of the message such as: the identity of the sender of the message, a priority associated with the message, a subject associated with the message, the semantic content of the message, the location from which the message was sent (if such information is available), etc.

At task 1020, processor 502 sets the brightness of the image based on pertinent entries from one or more call logs, and optionally, on one or more attributes of the message.

At task 1030, processor 502 sets the contrast of the image based on pertinent entries from one or more call logs, and optionally, on one or more attributes of the message.

At task 1040, processor 502 sets the resolution of the image based on pertinent entries from one or more call logs, and optionally, on one or more attributes of the message.

At task 1050, processor 502 sets the values of additional properties of the image (e.g., hue, saturation, position on display 311, speed of animation, etc.) based on pertinent entries from one or more call logs, and optionally, on one or more attributes of the message. After task 1050, execution continues at task 850.

Figure 11:
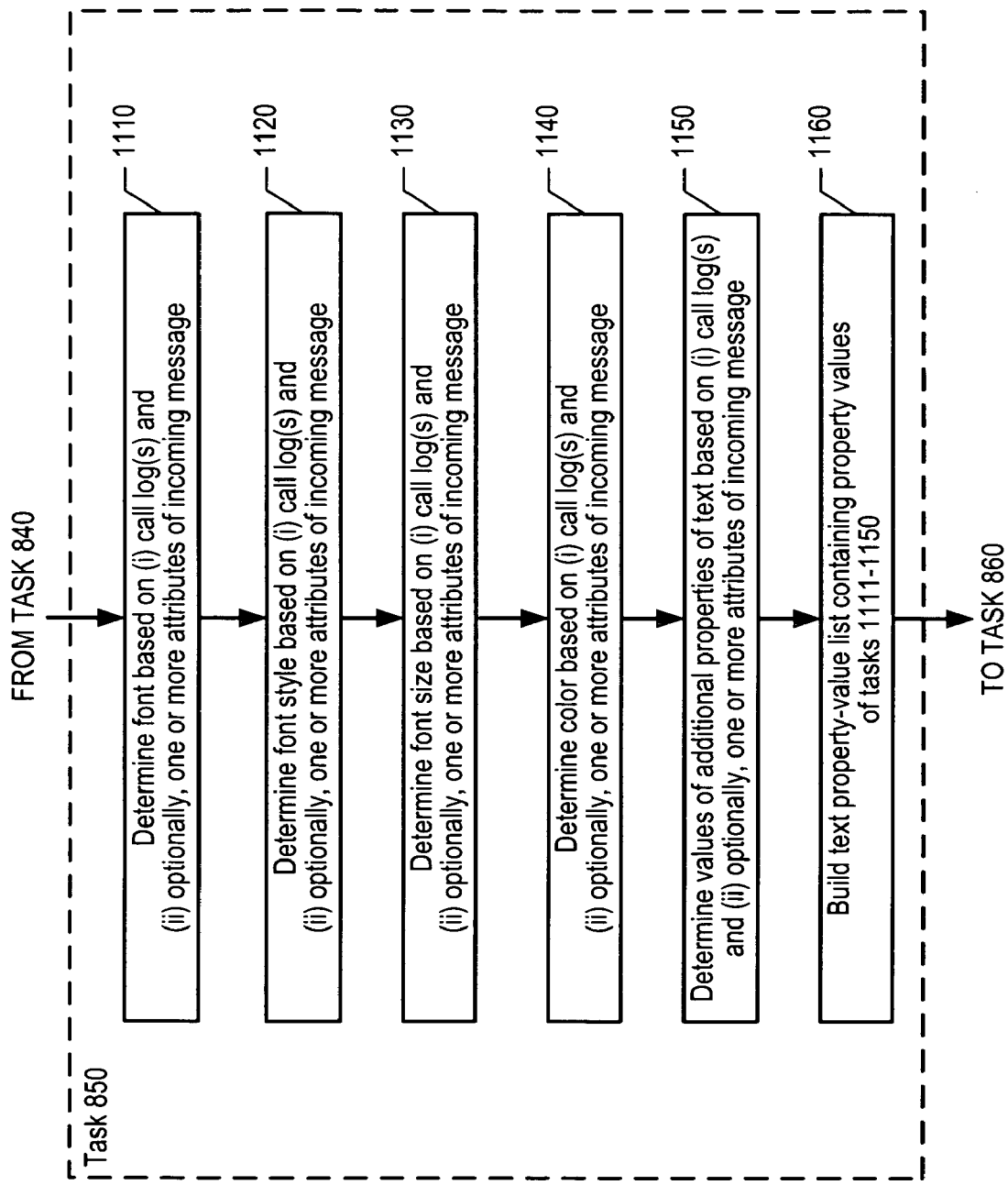
FIG. 11 depicts a detailed flowchart of task 850, as shown in FIG. 8, in accordance with the first illustrative embodiment of the present invention.

FIG. 11 depicts a detailed flowchart of task 850 in accordance with the first illustrative embodiment of the present invention. It will be clear to those skilled in the art which tasks depicted in FIG. 11 can be performed simultaneously or in a different order than that depicted.

At task 1110, processor 502 determines the text font based on pertinent entries from one or more call logs, and optionally, on one or more attributes of the message such as: the identity of the sender of the message, a priority associated with the message, a subject associated with the message, the semantic content of the message, the location from which the message was sent (if such information is available), etc.

At task 1120, processor 502 determines the font style (e.g., bold, italics, etc.) based on pertinent entries from one or more call logs, and optionally, on one or more attributes of the message.

At task 1130, processor 502 determines the font size based on pertinent entries from one or more call logs, and optionally, on one or more attributes of the message.

At task 1140, processor 502 determines the text color based on pertinent entries from one or more call logs, and optionally, on one or more attributes of the message.

At task 1150, processor 502 determines the values of additional properties of the text (e.g., background color, position on display 311, dynamic behavior, speed of dynamic behavior, etc.) based on pertinent entries from one or more call logs, and optionally, on one or more attributes of the message.

At task 1160, processor 502 builds a text property-value list based on tasks 1110 through 1150, in well-known fashion. After task 1160, execution continues at task 860.

Figure 12:
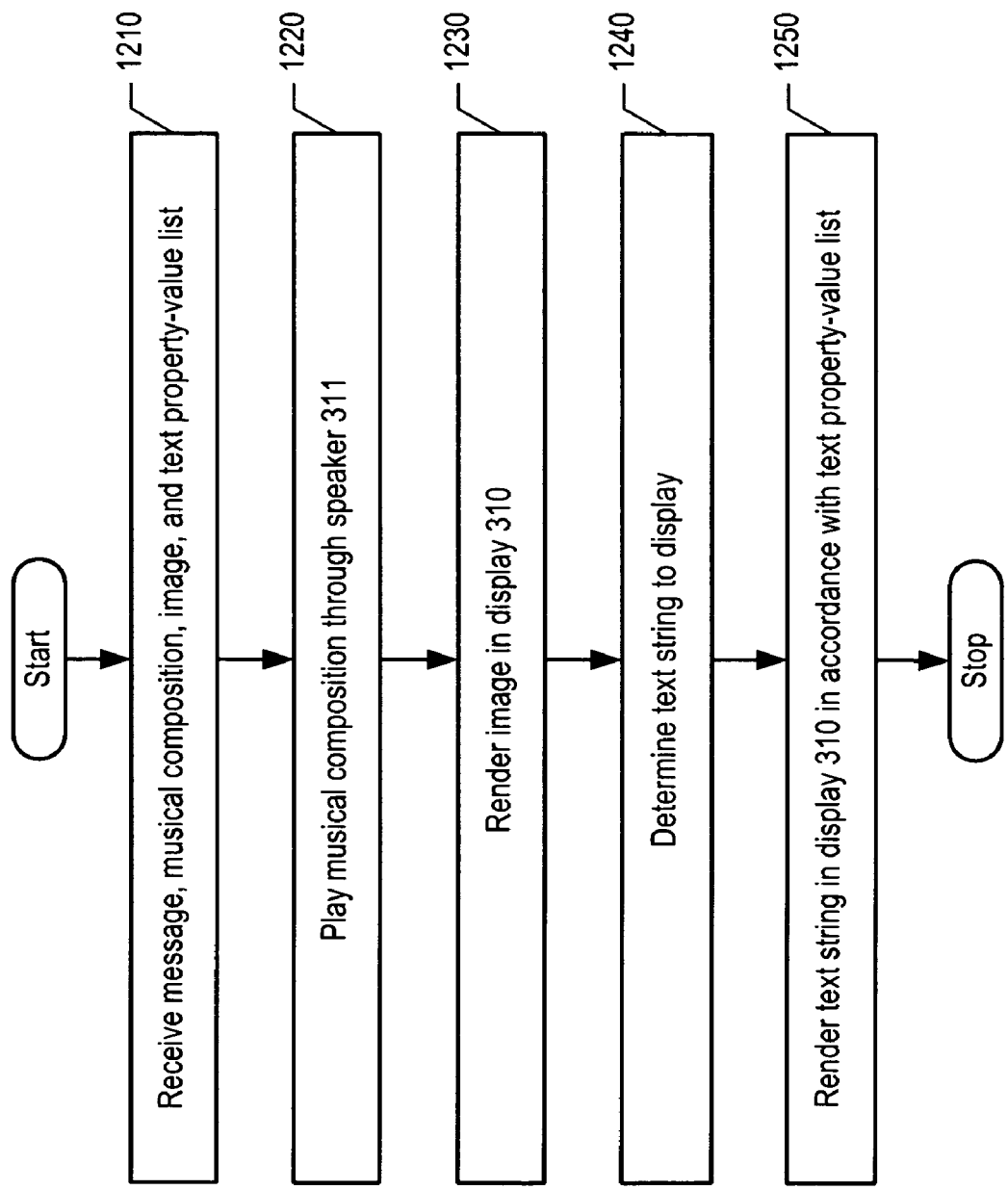
FIG. 12 depicts a flowchart of the salient tasks of telecommunications terminal 305, as shown in FIG. 3, in accordance with the first illustrative embodiment of the present invention.

FIG. 12 depicts a flowchart of the salient tasks of telecommunications terminal 305 in accordance with the first illustrative embodiment of the present invention.

At task 1210, receiver 601 of telecommunications terminal 305 receives a message, a musical composition, an image, and a text property-value list and forwards them to processor 602, in well-known fashion.

At task 1220, telecommunications terminal 305 plays the musical composition through speaker 312, in well-known fashion.

At task 1230, telecommunications terminal 305 renders the image in display 310, in well-known fashion.

At task 1240, telecommunications terminal 305 determines what text string to display to notify its user of the incoming message, in the same fashion as telecommunications terminal 105 in the prior art.

At task 1250, telecommunications terminal 305 renders the text string of task 1240 in display 310 in accordance with the text property-value list received at task 1210, in well-known fashion. After task 1250, the method of FIG. 12 terminates.

Figure 13:
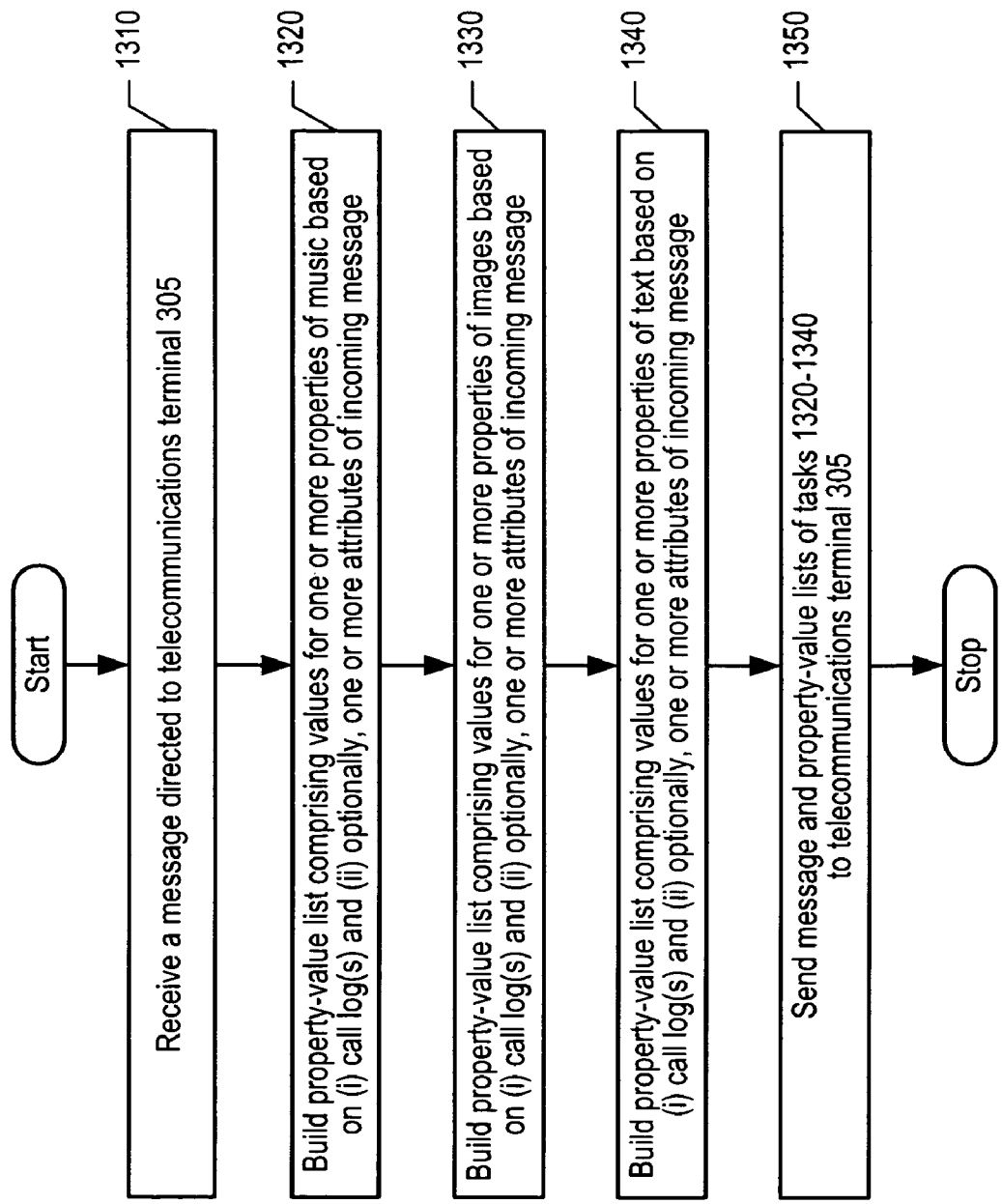
FIG. 13 depicts a flowchart of the salient tasks of network infrastructure element 401-i, as shown in FIG. 4, in accordance with the second illustrative embodiment of the present invention.

FIG. 13 depicts a flowchart of the salient tasks of network infrastructure element 401-*i* in accordance with the second illustrative embodiment of the present invention. In the second illustrative embodiment, network infrastructure element 401-*i* does not determine which ringtone and/or image is used to notify the user of telecommunications terminal 305. Network infrastructure element 401-*i* only determines the property values for the ringtone and the image, while telecommunications terminal 305 determines which ringtone (stored locally) to play and which image (stored locally) to display. As in the first illustrative embodiment, network infrastructure element 401-*i* determines the property values for text used to notify the user of telecommunications terminal 305 of the incoming message, but not the text itself.

In addition, as in the first illustrative embodiment the method of FIG. 13 need only be performed by one of the network infrastructure elements 401-*i* in the (potentially multi-hop) path from the sender of a message to telecommunications terminal 305. It will be clear to those skilled in the art which tasks depicted in FIG. 13 can be performed simultaneously or in a different order than that depicted.

At task 1310, receiver 501 of network infrastructure element 401-*i* receives a message directed to telecommunications terminal 305 and forwards the message to processor 502, in well-known fashion.

At task 1320, processor 502 builds a property-value list comprising values for one or more properties of music based on (i) information from one or more call logs, and optionally:
(ii) one or more attributes of the incoming message, as described in detail below and with respect to FIG. 14.

At task 1330, processor 502 builds a property-value list comprising values for one or more properties of images based on
    (i) information from one or more call logs, and optionally:
    (ii) one or more attributes of the incoming message, as described in detail below and with respect to FIG. 15.

At task 1340, processor 502 builds a property-value list comprising values for one or more properties of text based on
    (i) information from one or more call logs, and optionally:
    (ii) one or more attributes of the incoming message, as described in detail below and with respect to FIG. 16.

At task 1350, processor 502 forwards the message and the property-value lists of tasks 1320 through 1340 to transmitter 504 for sending to telecommunications terminal 305, in well-known fashion. After task 1350, the method of FIG. 13 terminates.

Figure 14:
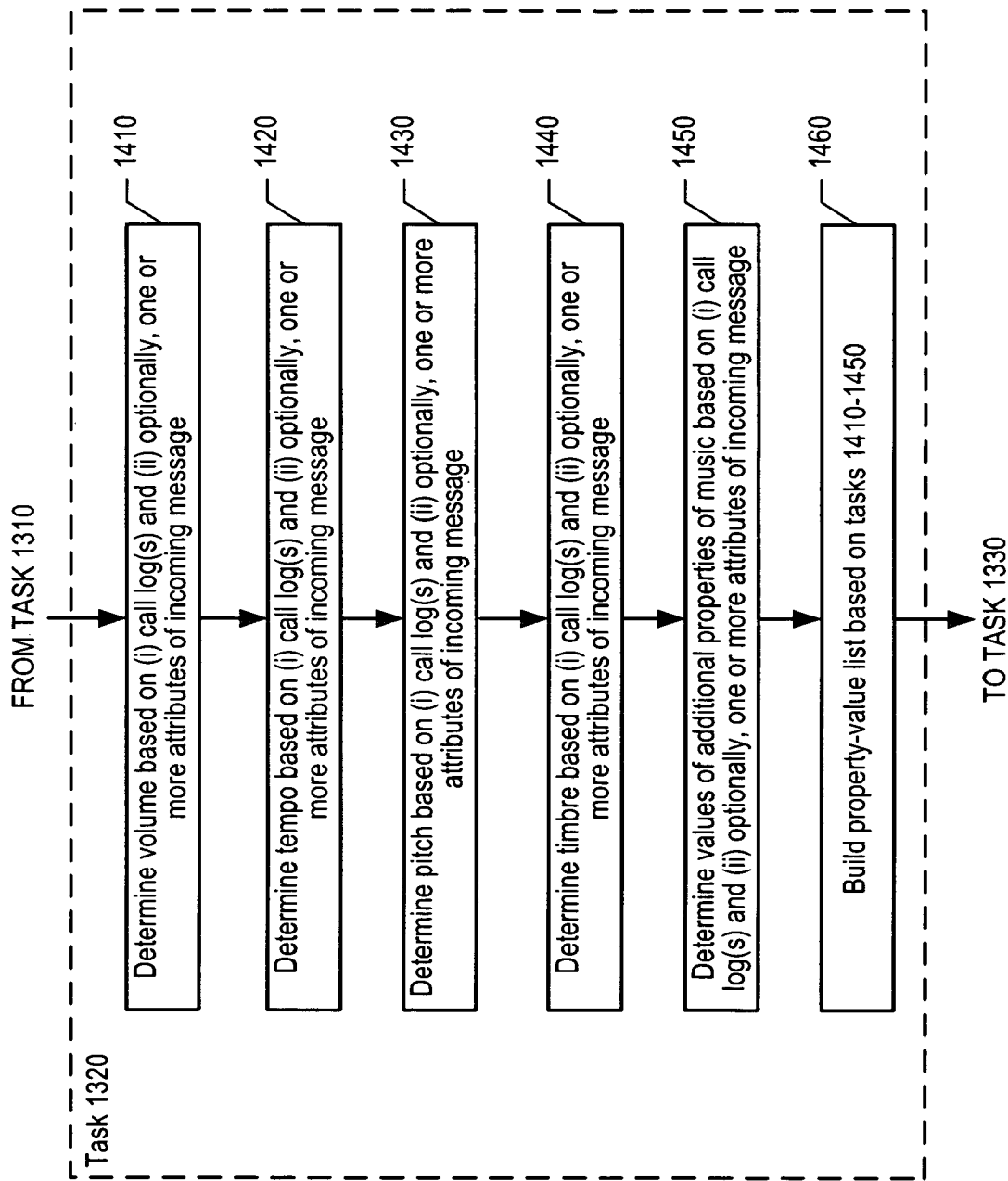
FIG. 14 depicts a detailed flowchart of task 1330, as shown in FIG. 13, in accordance with the second illustrative embodiment of the present invention.

FIG. 14 depicts a detailed flowchart of task 1320 in accordance with the second illustrative embodiment of the present invention. It will be clear to those skilled in the art which tasks depicted in FIG. 14 can be performed simultaneously or in a different order than that depicted.

At task 1410, processor 502 determines volume based on pertinent entries from one or more call logs, and optionally, on one or more attributes of the message such as: the identity of the sender of the message, a priority associated with the message, a subject associated with the message, the semantic content of the message, the location from which the message was sent (if such information is available), etc.

At task 1420, processor 502 determines tempo based on pertinent entries from one or more call logs, and optionally, on one or more attributes of the message.

At task 1430, processor 502 determines pitch (i.e., key signature) based on pertinent entries from one or more call logs, and optionally, on one or more attributes of the message.

At task 1440, processor 502 determines timbre (e.g., the musical instrument playing the composition, etc.) based on pertinent entries from one or more call logs, and optionally, on one or more attributes of the message.

At task 1450, processor 502 determines the values of additional properties of music (e.g., harmony, rhythm, gender for vocal music, language for vocal music, etc.) based on pertinent entries from one or more call logs, and optionally, on one or more attributes of the message.

At task 1460, processor 502 builds a property-value list based on tasks 1410 through 1450. After task 1460, execution continues at task 1330.

Figure 15:
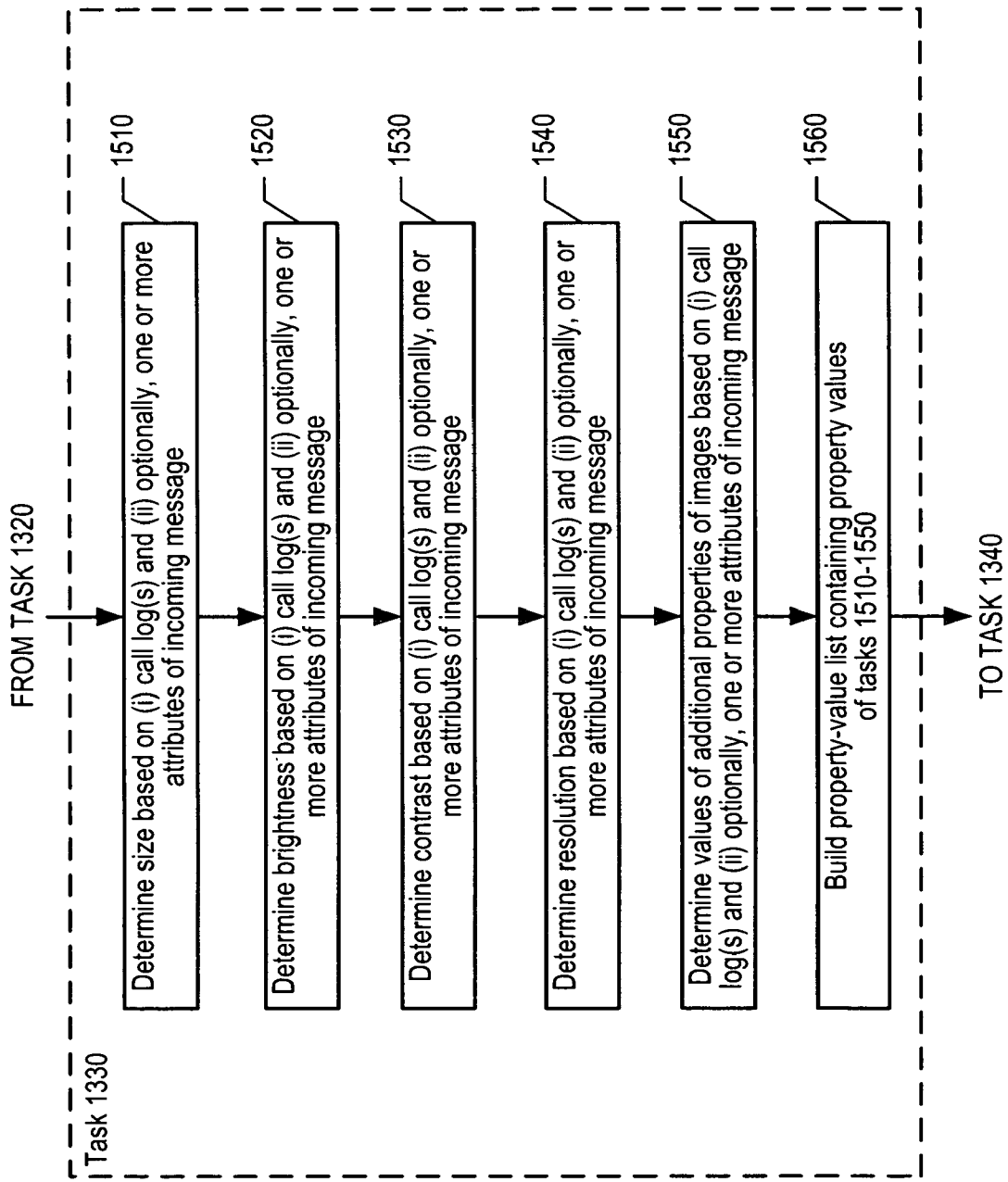
FIG. 15 depicts a detailed flowchart of task 1340, as shown in FIG. 13, in accordance with the second illustrative embodiment of the present invention.

FIG. 15 depicts a detailed flowchart of task 1330 in accordance with the second illustrative embodiment of the present invention. It will be clear to those skilled in the art which tasks depicted in FIG. 9 can be performed simultaneously or in a different order than that depicted.

At task 1510, processor 502 determines image size based on pertinent entries from one or more call logs, and optionally, on one or more attributes of the message such as: the identity of the sender of the message, a priority associated with the message, a subject associated with the message, the semantic content of the message, the location from which the message was sent (if such information is available), etc.

At task 1520, processor 502 determines brightness based on pertinent entries from one or more call logs, and optionally, on one or more attributes of the message.

At task 1530, processor 502 determines contrast based on pertinent entries from one or more call logs, and optionally, on one or more attributes of the message.

At task 1540, processor 502 determines resolution based on pertinent entries from one or more call logs, and optionally, on one or more attributes of the message.

At task 1550, processor 502 determines the values of additional properties of images (e.g., hue, saturation, position on display 311, speed of animation, etc.) based on pertinent entries from one or more call logs, and optionally, on one or more attributes of the message.

At task 1560, processor 502 builds a property-value list based on tasks 1510 through 1550. After task 1560, execution continues at task 1340.

Figure 16:
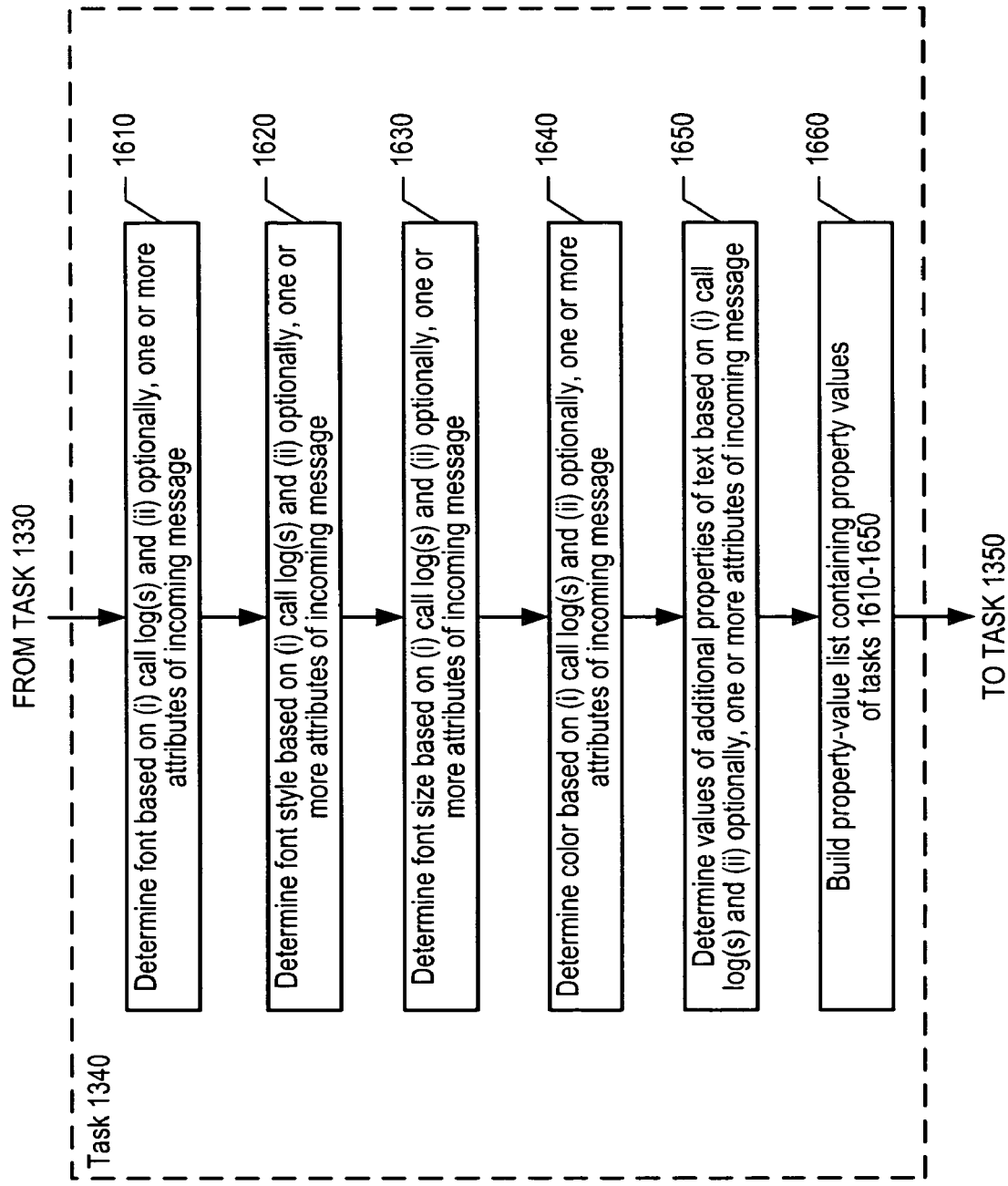
FIG. 16 depicts a detailed flowchart of task 1350, as shown in FIG. 13, in accordance with the second illustrative embodiment of the present invention.

FIG. 16 depicts a detailed flowchart of task 1340 in accordance with the second illustrative embodiment of the present invention. It will be clear to those skilled in the art which tasks depicted in FIG. 16 can be performed simultaneously or in a different order than that depicted.

At task 1610, processor 502 determines the text font based on pertinent entries from one or more call logs, and optionally, on one or more attributes of the message such as: the identity of the sender of the message, a priority associated with the message, a subject associated with the message, the semantic content of the message, the location from which the message was sent (if such information is available), etc.

At task 1620, processor 502 determines the font style (e.g., bold, italics, etc.) based on pertinent entries from one or more call logs, and optionally, on one or more attributes of the message.

At task 1630, processor 502 determines the font size based on pertinent entries from one or more call logs, and optionally, on one or more attributes of the message. At task 1640, processor 502 determines the text color based on pertinent entries from one or more call logs, and optionally, on one or more attributes of the message.

At task 1650, processor 502 determines the values of additional properties of text (e.g., background color, position on display 311, dynamic behavior, speed of dynamic behavior, etc.) based on pertinent entries from one or more call logs, and optionally, on one or more attributes of the message.

At task 1660, processor 502 builds a property-value list based on tasks 1610 through 1650, in well-known fashion. After task 1660, execution continues at task 1350.

Figure 17:
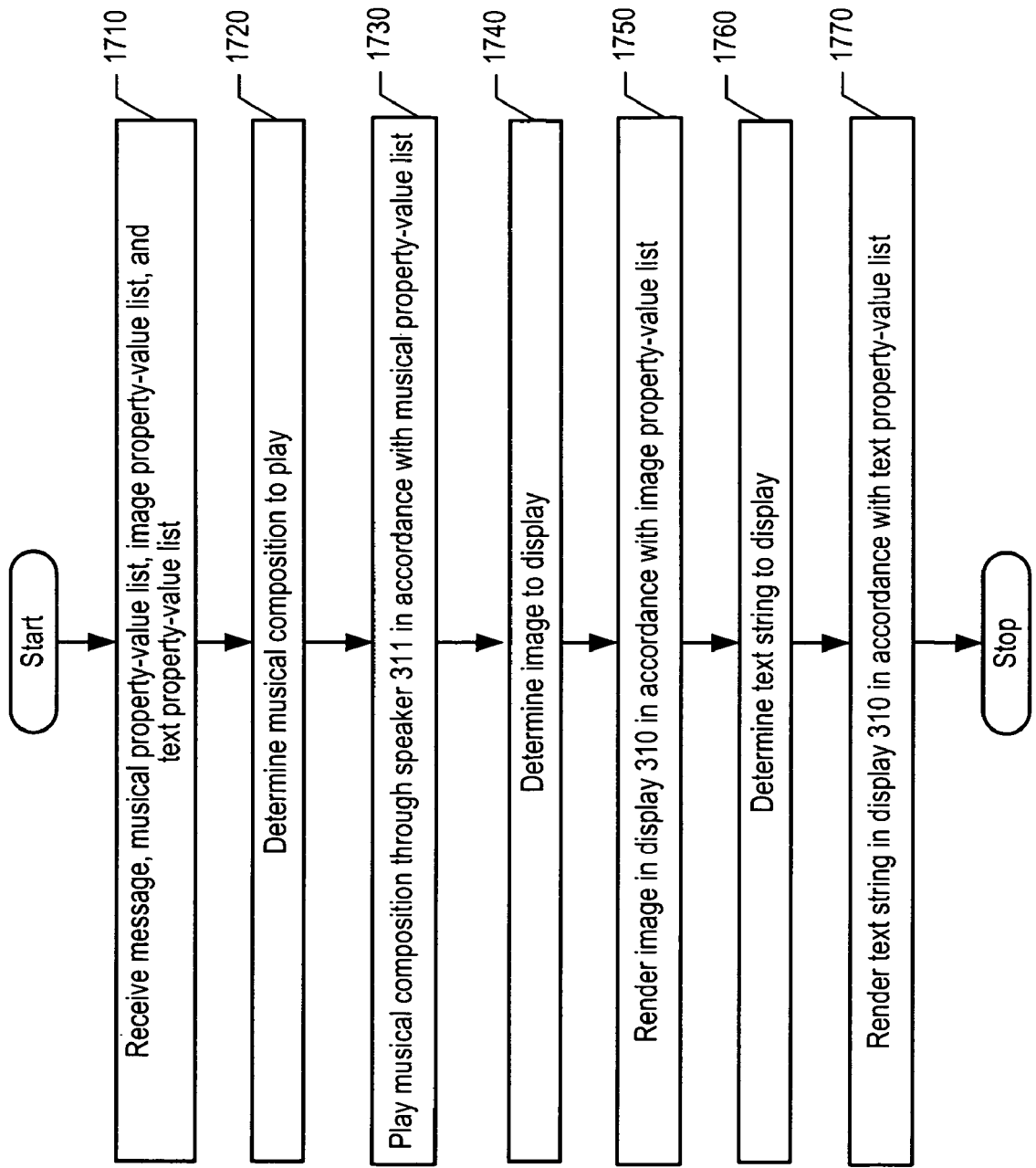
FIG. 17 depicts a flowchart of the salient tasks of telecommunications terminal 305, as shown in FIG. 3, in accordance with the second illustrative embodiment of the present invention.

FIG. 17 depicts a flowchart of the salient tasks of telecommunications terminal 305 in accordance with the second illustrative embodiment of the present invention.

At task 1710, receiver 601 of telecommunications terminal 305 receives a message, a musical property-value list, an image property-value list, and a text property-value list and forwards them to processor 602, in well-known fashion.

At task 1720, processor 602 determines what musical composition to play to notify the user of the arrival of the message, in the same fashion as telecommunications terminal 105 in the prior art.

At task 1730, processor 602 sends a signal to speaker 311 to play the musical composition of task 1720 in accordance with the musical property-value list received at task 1710, in well-known fashion.

At task 1740, processor 602 determines what image to display to notify the user of the arrival of the message, in the same fashion as telecommunications terminal 105 in the prior art.

At task 1750, processor 602 sends a signal to display 310 to render the image of task 1740 in accordance with the image property-value list received at task 1710, in well-known fashion.

At task 1760, processor 602 determines what text string to display to notify the user of the arrival of the message. In some embodiments of the present invention, processor 602 might determine what text string to display in the same way that telecommunications terminal 105 of the prior art determines the appropriate text string, while in some other embodiments, the text string might itself be based on information from one or more call logs (e.g., "Incoming Call from Liz Brown (5$^{th}$ call today)", etc.).

At task 1770, processor 602 sends a signal to display 310 to render the text string of task 1760 in accordance with the text property-value list received at task 1710, in well-known fashion. After task 1770, the method of FIG. 17 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving at a telecommunications terminal
      (i) a message, and
      (ii) a first signal that conveys an instance of a musical composition that is based on said message; and
   (b) outputting an acoustic signal based on said first signal to notify the user of said telecommunications terminal of the arrival of said message;
   wherein the value of a property of said instance of said musical composition is based on the contents of a call log that is stored on a network infrastructure element; and
   wherein said property is a property of music that is independent of melody.

2. The method of claim 1 wherein said first signal is one of an audio clip and a Musical Instrument Digital Interface file.

3. The method of claim 1 wherein said property is one of volume and tempo.

4. The method of claim 1 wherein the contents of said call log comprises the number of times the sender of said message has attempted to contact the user of said telecommunications terminal during a time interval.

5. A method comprising:
   (a) receiving a message directed to a telecommunications terminal; and
   (b) sending said message and a signal that conveys an instance of a musical composition to said telecommunications terminal;
   wherein said instance of said musical composition is for notifying the user of said telecommunications terminal of the arrival of said message; and
   wherein the value of a property of said instance is based on the contents of a call log that is stored on a network infrastructure element; and
   wherein said property is a property of music that is independent of melody.

6. The method of claim 5 wherein said first signal is one of an audio clip and a Musical Instrument Digital Interface file.

7. The method of claim 5 wherein the contents of said call log comprises the time at which the sender of said message most recently sent a prior message to the user of said telecommunications terminal.

8. A method comprising:
   (a) receiving at a telecommunications terminal
      (i) a message, and
      (ii) a value of a property of music; and
   (b) playing a musical composition in accordance with said value to notify the user of said telecommunications terminal of the arrival of said message;
   wherein said value is based on the contents of at least one call log that is stored on a network infrastructure element; and
   wherein said property of music is independent of melody.

9. The method of claim 8 wherein said property is one of pitch and timbre.

10. The method of claim 8 wherein said at least one call log comprises a first call log associated with said telecommunications terminal and a second call log associated with another telecommunications terminal.

11. A method comprising:
    (a) receiving a message directed to a telecommunications terminal;
    (b) determining the value of a property of music based on the contents of a call log that is stored on a network infrastructure element; and
    (c) sending said message and said value to said telecommunications terminal, based on the reception of said message;
    wherein said property of music is independent of melody.

12. The method of claim 11 wherein said value is for a ringtone that is played at said telecommunications terminal to indicate the arrival of said message.

13. The method of claim 11 wherein said value is also based on an attribute of said message.

* * * * *